United States Patent [19]

Duttweiler

[11] Patent Number: 5,631,899
[45] Date of Patent: May 20, 1997

[54] ACOUSTIC ECHO CANCELER

[75] Inventor: Donald L. Duttweiler, Rumson, N.J.

[73] Assignee: Lucent Technologies Inc., Murray Hill, N.J.

[21] Appl. No.: 455,377

[22] Filed: May 31, 1995

[51] Int. Cl.$^6$ .................................................. H04B 3/23
[52] U.S. Cl. .................................... 370/291; 379/411
[58] Field of Search .................... 370/32.1, 32; 379/406, 379/407, 410, 411

[56] References Cited

U.S. PATENT DOCUMENTS

| | | | |
|---|---|---|---|
| 4,554,417 | 11/1985 | Boyer | 179/170.2 |
| 4,574,166 | 3/1986 | Gritton | 370/32.1 |
| 4,636,586 | 1/1987 | Schiff | 379/410 |
| 4,935,919 | 6/1990 | Hiraguchi | 370/32.1 |
| 4,965,823 | 10/1990 | Nakagawa et al. | 370/32.1 |
| 5,007,046 | 4/1991 | Erving et al. | 370/32.1 |
| 5,131,032 | 7/1992 | Esaki et al. | 379/410 |
| 5,181,198 | 1/1993 | Lechleider | 370/32.1 |
| 5,263,020 | 11/1993 | Yatsuzuka et al. | 370/32.1 |
| 5,313,498 | 5/1994 | Sano | 370/32.1 |
| 5,315,585 | 5/1994 | Iizuka et al. | 370/32.1 |
| 5,353,348 | 10/1994 | Sendyk et al. | 379/411 |
| 5,390,250 | 2/1995 | Janse et al. | 379/410 |
| 5,418,848 | 5/1995 | Armbuster | 379/410 |
| 5,428,605 | 6/1995 | Andre | 370/32.1 |
| 5,463,618 | 10/1995 | Furukawa et al. | 370/32.1 |
| 5,500,892 | 3/1996 | Essig | 370/32.1 |

OTHER PUBLICATIONS

ICASSP–93, 1993 IEEE International Conference on Acoustics, Speech. and Signal Processing, Plenary, Special, Audio, Underwater Acoustics, VLSI, Neural Networks, vol. I of V, Apr. 27–30, 1993, Minneapolis Convention Center, Minneapolis, Minnesota, USA, 93CH3252–4.

IEEE Transactions On Communications, vol. COM–26, No. 5, May 1978, pp. 647–653, authored by Donald L. Duttweiler, entitled "A Twelve–Channel Digital Echo Canceler".

IEEE Journal On Selected Areas In Communications, vol. SAC–2, No. 2, Mar. 1984, pp. 297–303, authored by Donald L. Duttweiler, C. W. K. Gritton, Kevin D. Kolwicz and Ying G. Tao, entitled "A Cascadable VLSI Echo Canceller".

Primary Examiner—Alpus H. Hsu
Assistant Examiner—Seema S. Rao
Attorney, Agent, or Firm—Thomas Stafford

[57] ABSTRACT

Acoustic echos are canceled by employing a first echo canceler having a comparatively short first impulse response synthesis capability which is connected between a transmit path and receive path for generating a first error signal and for canceling echo signals in the transmit path, and at least a second echo canceler having a comparatively long second impulse response synthesis capability connected in parallel with the first echo canceler between the transmit and the receive path. The second echo canceler is supplied with the first error signal from the first echo canceler and is adaptively operating simultaneously with but independent of the first echo canceler to further cancel echos in the transmit path. More specifically, the first echo canceler is intended to capture the direct path acoustic echo and any early arriving echos that are stable which are not time yawing. Since the direct path acoustic echo and the stable early arriving echos are not time varying, the adaptive adaptation rate, i.e. loop gain, of the first echo canceler adaptation circuitry can be chosen to be a very small value so that it can adapt accurately in the presence of undetected near-end speech. Then, with the direct path acoustic echo and any stable early arriving echos having been substantially removed by the first echo canceler, the first error signal output from the first echo canceler has a comparatively weaker echo component to corrupt any near-end speech that might be present and, consequently, the near-end speech can be more reliably detected by monitoring the first error signal from the first echo canceler. Since the near-end speech can be more reliably detected by employing the first error signal from the first echo canceler, the adaptation rate of the second echo canceler can be chosen to be at a significantly faster rate without undo impairment caused by undetected near-end speech. In a specific embodiment of the invention, the first echo canceler employs a transversal filter having predetermined fixed coefficients in order to cancel the direct path acoustic echo component and any stable early arriving echos.

7 Claims, 1 Drawing Sheet

ACOUSTIC ECHO CANCELER

CROSS REFERENCE TO RELATED APPLICATION

U.S. patent pending application Ser. No. 08/455,385 was filed concurrently herewith.

TECHNICAL FIELD

This invention relates to audio systems and, more particularly, to acoustic echo cancellation for use in such audio systems.

BACKGROUND OF INVENTION

Adaptive filter arrangements have been employed in attempting to effectively cancel acoustic echos. However, it is generally necessary to inhibit adaptation of the adaptive filter during intervals that so-called near-end speech is present. Otherwise, in the presence of near-end speech, the adaptive filter will diverge from an optimal echo path estimate. Indeed, known near-end speech detectors do not operate as well as might be desired in detecting the near-end speech in the presence of acoustic echos. As indicated above, undetected near-end speech will cause the echo path estimate being generated to diverge from the desired optimal value. Consequently, the acoustic echo will not be sufficiently canceled, which result is undesirable.

SUMMARY OF THE INVENTION

The problems and limitations of prior acoustic echo canceler arrangements are overcome by employing a first echo canceler having a comparatively short first impulse response synthesis capability which is connected between a transmit path and receive path for generating a first error signal and for canceling echo signals in the transmit path, and at least a second echo canceler having a comparatively long second impulse response synthesis capability connected in parallel with the first echo canceler between the transmit and the receive path. The second echo canceler is supplied with the first error signal from the first echo canceler and is adaptively operating simultaneously with but independent of the first echo canceler to further cancel echos in the transmit path.

More specifically, the first echo canceler is intended to capture the direct path acoustic echo and any early arriving echos that are stable and not time varying. Since the direct path acoustic echo and the stable early arriving echos are not time varying, the adaptation rate, i.e. loop gain, of the first echo canceler adaptation circuitry can be chosen to be a very small value so that adaptation is accurate in the presence of undetected near-end speech. Then, with the direct path acoustic echo and any stable early arriving echos having been substantially removed by the first echo canceler, the first error signal output from the first echo canceler has a comparatively weaker echo component to corrupt any near-end speech that might be present and, consequently, the near-end speech can be more reliably detected by monitoring the first error signal from the first echo canceler. Since the near-end speech can be more reliably detected by employing the first error signal from the first echo canceler, the adaptation rate of the second echo canceler can be chosen to be at a significantly faster rate without undo impairment caused by undetected near-end speech.

In a specific embodiment of the invention, the first echo canceler employs a filter having predetermined fixed coefficients in order to cancel the direct path acoustic echo component and any stable early arriving echos.

DETAILED DESCRIPTION

Figure 1:
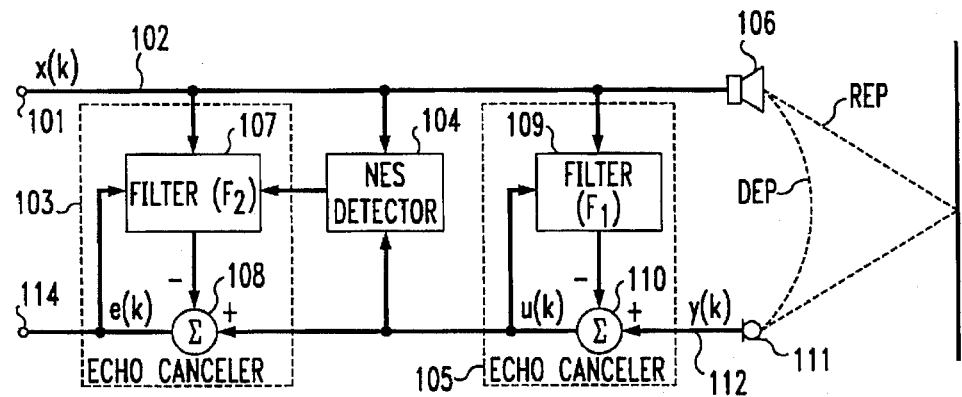
FIG. 1 shows an audio system including first and second echo cancelers in one embodiment of the invention.

FIG. 1 shows in simplified block diagram form one embodiment of the invention. Specifically, a received signal $x(k)$ is supplied to receive input 101 and, in turn, via receive path 102 to echo canceler 103, near-end speech (NES) detector 104, echo canceler 105 and loudspeaker 106. Echo cancelers 103 and 105 may be any one of a number known in the art. It is noted that the signals being processed in echo cancelers 103 and 105, and NES 104 are digital. The required digital to analog (D/A) and analog to digital (A/D) converters in receive path 102 and transmit path 112, respectively are not shown. In this example, echo cancelers 103 and 105 include adaptive transversal filters 107 and 109, respectively, which are of a type broadly disclosed in U.S. Pat. No. 3,500,000 and also described in an article by D. L. Duttweiler entitled, "A Twelve-Channel Digital Echo Canceler", *IEEE Transactions on Communications*, VOL. COM-26, No. 5, May, 1978, Pages 647–653. Briefly, echo canceler 103 includes adaptive transversal filter (F2) 107 and algebraic combiner 108. Similarly, echo canceler 105 includes adaptive transversal filter (F1) 109 and algebraic combiner 110. It should be noted that in some applications echo canceler 105 may include a transversal filter 109 having fixed coefficients.

In practice microphone 111 picks up the desired speech signal from anybody talking in a room, enclosed area or the like, but also unavoidably picks up the audio output from loudspeaker 106. Conceptually, the audio signal picked up by microphone 111 has two acoustic echo components, one component is the direct acoustic echo path (DEP) from loudspeaker 106 to microphone 111 and the other is long term echo components reflecting off walls and objects in the room and is indicated by the reflective acoustic echo path (REP). It is noted that the direct echo path does not include any of the reflected echo components, is time invariant, and usually is stronger, i.e., has significantly more energy, than the reflective echo paths. In contrast, the reflective echo paths are time variant as people move around in the room. Additionally, there may also be so-called early arriving echos that are stable and early arriving echos that are unstable.

In this example, echo canceler 105 is primarily expected to cancel the echo component traversing the direct echo path and any early arriving echos that are stable. To this end, adaptive transversal filter (F1) 109 is configured to adapt slowly, if at all, which will allow it to satisfactorily perform in the presence of near-end speech. This slow adaptation is necessary in order to properly converge to the first echo estimate in the presence of the acoustic echo components and near-end speech. If the adaptation rate were too fast an erroneous first echo estimate would result. The signal $y(k)$ from microphone 111 is supplied to algebraic combiner 110 where a first echo estimate of the direct echo component and of any early arriving stable echo component synthesized by adaptive transversal filter 109 is subtracted from it to generate first error signal $u(k)$. First error signal $u(k)$ is supplied to adaptive transversal filter 109 where it is utilized in conjunction with the received signal x(k) to adapt the first echo estimate in well known fashion. First error signal u(k) is supplied to near-end speech detector (NES) 104 and to one input of algebraic combiner 108 of echo canceler 103. Adaptive transversal filter 107 synthesizes a second echo estimate of the remaining possibly time varying portion of the echo. To this end, adaptive transversal filter 107 is configured for fast adaptation. Because it is so configured, it is essential that the adaptation of adaptive transversal filter 107 be inhibited when near-end speech is present in signal u(k). The second echo estimate synthesized by adaptive transversal filter 107 is algebraically subtracted from first error signal u(k) by algebraic combiner 108 to yield second error signal e(k). The second error signal e(k) is supplied as the desired output to be transmitted to a remote receiver and is also supplied to adaptive transversal filter 107 where it is employed with input signal x(k) to adapt the second echo estimate in well known fashion.

As indicated above, adaptive transversal filter 109 will generally have a comparatively short echo synthesis capability. This comparatively short echo synthesis capability should be about equal to the minimum needed to cancel the direct acoustic path echo from loudspeaker 106 and any early arriving echos that are stable. Exactly what this required echo synthesis capability length is will depend on the geometry (loudspeaker 106 to microphone 111 distance and the room dimensions) of the intended application. Ten (10) to twenty (20) milliseconds of echo synthesis capability in first echo canceler 105 would be typical.

First echo canceler 105 should also be chosen to have a comparatively slow adaptation rate. This adaptation rate must be slow enough that it is possible to adapt to a "good" echo path estimate even in the presence of near-end speech. A typical adaptation time constant for adaptive filter 109 in echo canceler 105 would be one (1) minute. Furthermore, in certain applications the distance between loud speaker 106 and microphone 111 will be permanently fixed. In such applications, adaptive transversal filter 109 in echo canceler 105 can have fixed coefficients because there will be no substantial change in the direct echo path. These fixed co-coefficients may be determined simply by letting an adaptive transversal filter used in echo canceler 105 initially learn the direct echo path and then inhibiting further adaptation. Alternatively, an external adaptive transversal filter can be employed to learn the desired fixed filter co-coefficients and then setting the co-coefficients of transversal filter 109 to those learned by the external adaptive transversal filter.

Adaptive transversal filter 107 of echo canceler 103 has a comparatively long impulse response synthesis capability since the reflective echos it is intended to synthesize can persist for long times. Again, the application geometry will dictate an exact number for the length. A few hundreds of milliseconds will be a typical length. Also, since the echo paths traversed by the reflective echos that echo canceler 103 is intended to cancel might well be time varying, an aggressive, comparatively fast adaptation rate should be chosen. How fast an adaptation rate of transversal filter 107 can be supported will depend on its length (all else being equal, shorter filters can adapt faster). Typical adaptation time constants will be about a second. The aggressive adaptation rate chosen for adaptive transversal filter 107 will necessitate inhibiting adaptation during the presence of near-end speech, as is well known in the art. Alternatively, the loop gain of adaptive filter 107 can be decreased to slow its adaptation rate during the presence of near-end speech. Indeed, inhibiting adaptation is the same as reducing the loop gain to zero. It is also well known that detection of near-end speech is a difficult task.

It is noted that the operation of echo canceler 105 in substantially removing the direct acoustic echo component and any stable early arriving echoes from microphone signal y(k), significantly improves the signal-to-noise ratio (SNR) in the resulting first error signal u(k). Consequently, first error signal u(k) can be employed in other downstream signal processing to significantly improve the echo cancellation processes. One of these processes is detection of near-end speech via NES 104.

To this end, NES 104 is supplied with input signal x(k) and first error signal u(k) and is operative to detect near-end speech in the first error signal u(k). A number of near-end speech detectors are known in the art, in this example a so called A. A. Geigel near-end speech detector algorithm is employed which is described in the D. L. Duttweiler article noted above and specifically at page 649 of that article. Any near-end speech detection algorithm will work better if the transmit path signal y(k) it is supplied with has a comparatively weak echo component. Hence, because echo canceler 105 has removed a substantial portion of the echo in the microphone signal y(k), NES 104 is able to perform much more satisfactorily than it would be able to if the signal u(k) had not first been created by echo canceler 105. Because of the ability to better detect near-end speech, there will be less divergence of the coefficients of adaptive transversal filter 107 and, consequently, adaptive transversal filter 107 can adapt faster than otherwise possible without the improved near-end speech detection.

It is generally necessary to have some so-called backup echo control strategies because there may be some motion in the room when there is no received signal x(k) present. There is no hope of tracking changes in the time varying portion of the echo when x(k) is not presented to echo canceler 103 and echo return loss enhancement by echo canceler 103 is degraded until x(k) returns for sufficient time to allow adaptation of adaptive transversal filter 107 to the new impulse response.

Figure 2:
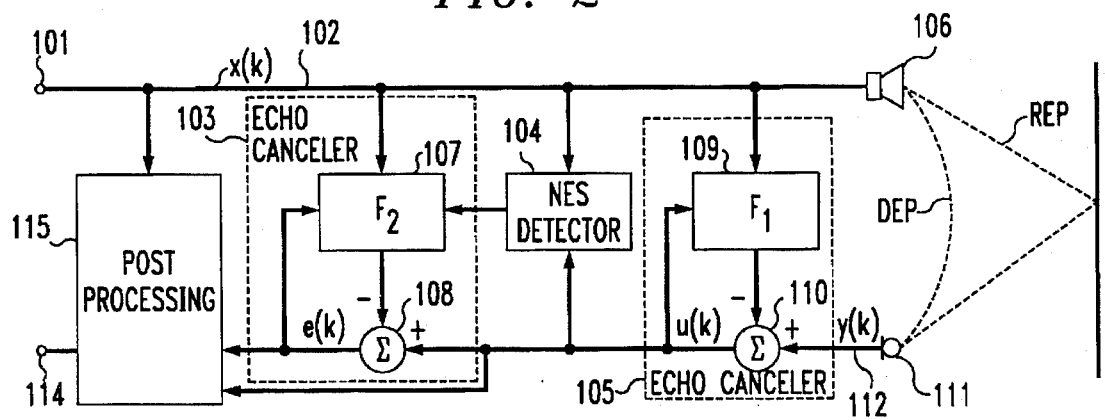
FIG. 2 shows another audio system including the first and second echo cancelers of the invention and additional speech signal processing.

FIG. 2 shows another acoustic echo canceler arrangement employing the embodiment of FIG. 1 and including some downstream signal processing. The elements of the arrangement shown in FIG. 2 that are identical in structure and operation as those shown in FIG. 1 have been similarly numbered and will not be described again in detail. The only difference between the arrangement of FIG. 2 and the embodiment of FIG. 1 is the addition of downstream post processing unit 115. Such downstream processing can include, for example, residual echo control, noise matching, another echo canceler or the like. Examples of residual echo control and noise matching are described in an article entitled "A Cascadable VLSI Echo Canceller", *IEEE Journal On Selected Areas In Communications,* VOL. SAC-2, NO. 2 March, 1984, pages 297–303. It is noted that post processing unit 115 also utilizes the first error signal u(k) to improve its processing capabilities. For residual echo control, intervals including only far-end speech are detected and the transmit path is opened during such detected intervals of only far-end speech.

Figure 3:
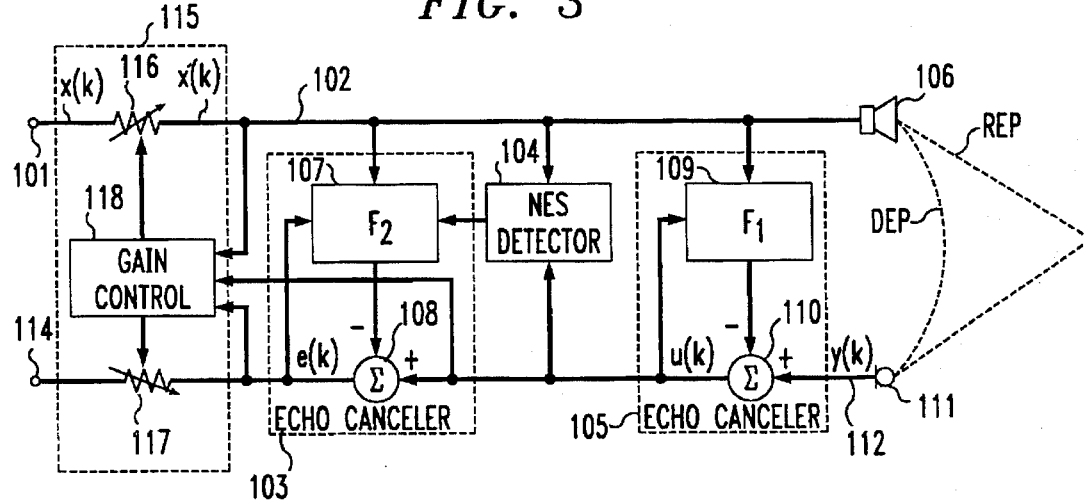
FIG. 3 shows another arrangement employing an embodiment of the invention including post audio signal processing.

FIG. 3 shows another acoustic echo canceler arrangement employing the embodiment of FIG. 1 and including some downstream signal processing. The elements of the arrangement shown in FIG. 3 that are identical in structure and operation as those shown in FIG. 1 have been similarly numbered and will not be described again in detail. The only difference between the arrangement of FIG. 3 and the embodiment of FIG. 1 is the addition of downstream post processing unit 115. Such downstream processing in this example includes control of gain in both directions of transmission. This is realized, in this example, by employing variable attenuators 116 and 117 under control of control unit 118. Attenuator 116 is employed to control the gain in the receive path while attenuator 117 controls the gain in the transmit path. Control unit 118 is supplied with received signal x'(k), second error signal e(k) and the first error signal u(k) for generating control signals for attenuators 116 and 117. Again, since the direct echo component has been removed from first error signal u(k), gain control unit 118 can perform better in generating the control signals for attenuators 116 and 117. One arrangement for generating such gain control signals is disclosed in U.S. Pat. No. 5,007,046 issued Apr. 9, 1991.

I claim:

1. An acoustic echo canceler arrangement comprising:

first echo canceler means connected between a receive path and transmit path and having a first impulse response synthesis capability for generating a first error signal and for canceling echo signals in the transmit path, said first echo canceler means includes a first adaptive transversal filter configured to generate a first echo estimate of a relatively time invariant echo component of the echo signals in said transmit path, wherein the adaptation rate of the first adaptive transversal filter is comparatively slow so that the first adaptive transversal filter can converge to the first echo estimate in the presence of near-end speech and first algebraic combining means for algebraically subtracting the first echo estimate from a signal supplied to the transmit path; and at least second echo canceler means having a second impulse response synthesis capability comparatively longer than said first impulse response connected in parallel with said first echo canceler means between the receive path and the transmit path, said at least second echo canceler means being supplied with said first error signal and being adaptive to operate simultaneously with said first echo canceler means for further canceling echo signals in said transmit path, said at least second echo canceler means includes a second adaptive transversal filter configured to generate a second echo estimate of the time varying echo component in said first error signal in the transmit path, and the adaptation rate of the second adaptive transversal filter is comparatively fast so that it can track time variant echo components in the first error signal, second algebraic combining means for algebraically subtracting the second echo estimate from the first error signal to yield a second error signal, said first and second echo cancelers operating independently of each other.

2. The invention as defined in claim 1 further including means responsive to said first error signal and a signal on the receive path for detecting near-end speech in said first error signal and for generating an inhibit signal when said near-end speech is detected, and wherein said second echo canceler includes an inhibit input supplied with said inhibit signal for inhibiting adaptation of said second echo canceler during intervals that near-end speech is detected.

3. The invention as defined in claim 1 further including means responsive to said first error signal and a signal on the receive path for detecting near-end speech in said first error signal and for generating a control signal when said near-end speech is detected, and wherein said second echo canceler includes a control input supplied with said control signal for slowing adaptation of said second echo canceler during intervals that near-end speech is detected.

4. The invention as defined in claim 1 wherein the first impulse response is comparatively short in order to cancel echos of short time duration and the second impulse response is comparatively long in order to cancel echos of long time duration.

5. The invention as defined in claim 1 further including means for processing the second error signal, said means for processing includes means for detecting when only far-end speech is present and means for opening the transmit path when such far-end speech only has been detected.

6. An acoustic echo canceler arrangement comprising:

first echo canceler means connected between a receive path and transmit path and having a first impulse response synthesis capability for generating a first error signal and for canceling echo signals in the transmit path, said first echo canceler means includes a first transversal filter configured to generate a first echo estimate of a relatively time invariant echo component of the echo signals in said transmit path and first algebraic combining means for algebraically subtracting the first echo estimate from a signal supplied to the transmit path;

at least second echo canceler means having a second impulse response synthesis capability comparatively longer than said first impulse response connected in parallel with said first echo canceler means between the receive path and the transmit path, said at least second echo canceler means being supplied with said first error signal and being adaptive to operate simultaneously with said first echo canceler means for further canceling echo signals in said transmit path, said at least second echo canceler means includes an adaptive transversal filter configured to generate a second echo estimate of the time varying echo component in said first error signal in the transmit path and second algebraic combining means for algebraically subtracting the second echo estimate from the first error signal to yield a second error signal, said first and second echo cancelers operating independently of each other; and means for controllably adjusting loss in the receive path and the transmit path, said means for controllably adjusting loss being supplied with a signal on the receive path and the second error signal and being responsive to said first error signal for setting the amount of loss in either the receive path or the transmit path.

7. An acoustic echo canceler arrangement comprising:

first echo canceler means connected between a receive path and transmit path and having a first impulse response synthesis capability for generating a first error signal and for canceling echo signals in the transmit path, said first echo canceler means includes a first transversal filter configured to generate a first echo estimate of a relatively time invariant echo component of the echo signals in said transmit path and first algebraic combining means for algebraically subtracting the first echo estimate from a signal supplied to the transmit path;

at least second echo canceler means having a second impulse response synthesis capability comparatively longer than said first impulse response connected in parallel with said first echo canceler means between the receive path and the transmit path, said at least second echo canceler means being supplied with said first error signal and being adaptive to operate simultaneously with said first echo canceler means for further canceling echo signals in said transmit path, said at least second echo canceler means includes an adaptive transversal filter configured to generate a second echo estimate of the time varying echo component in said first error signal in the transmit path and second algebraic combining means for algebraically subtracting the second echo estimate from the first error signal to yield a second error signal, said first and second echo cancelers operating independently of each other; and means for processing the second error signal, said means for processing being supplied with a signal on the receive path and the second error signal and being responsive to said first error signal for further processing the second error signal.

* * * * *